United States Patent
Ho et al.

(10) Patent No.: US 10,000,617 B2
(45) Date of Patent: Jun. 19, 2018

(54) METHOD OF MANUFACTURING POROUS FLUORINE-CONTAINING POLYMER MEMBRANE

(71) Applicant: INDUSTRIAL TECHNOLOGY RESEARCH INSTITUTE, Hsinchu (TW)

(72) Inventors: Chia-Hua Ho, Miaoli (TW); Min-Chao Chang, Hsinchu (TW); Teh-Ming Liang, Tainan (TW); Ren-Yang Horng, Hsinchu (TW); Hsin Shao, Zhubei (TW); Meng-Shun Huang, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 169 days.

(21) Appl. No.: 14/982,987

(22) Filed: Dec. 29, 2015

(65) Prior Publication Data
US 2017/0174857 A1  Jun. 22, 2017

(30) Foreign Application Priority Data
Dec. 16, 2015 (TW) .............................. 104142227

(51) Int. Cl.
| | | |
|---|---|---|
| C08J 9/26 | (2006.01) | |
| B01D 67/00 | (2006.01) | |
| B01D 71/32 | (2006.01) | |
| B01D 71/34 | (2006.01) | |
| B01D 71/76 | (2006.01) | |
| C08J 9/28 | (2006.01) | |
| B01D 61/36 | (2006.01) | |

(52) U.S. Cl.
CPC .............. *C08J 9/26* (2013.01); *B01D 67/003* (2013.01); *B01D 71/32* (2013.01); *B01D 71/34* (2013.01); *B01D 71/76* (2013.01); *C08J 9/28* (2013.01); *B01D 61/364* (2013.01); *B01D 2323/18* (2013.01); *C08J 2201/0544* (2013.01); *C08J 2327/12* (2013.01)

(58) Field of Classification Search
CPC ...... B01D 67/003; B01D 71/32; B01D 71/34; B01D 71/76; B01D 2323/18; B01D 61/364; C08J 9/26; C08J 9/28; C08J 2201/0544; C08J 2327/12; C08J 2327/16
See application file for complete search history.

(56) References Cited

U.S. PATENT DOCUMENTS

| | | | |
|---|---|---|---|
| 5,708,040 A | 1/1998 | Hong et al. | |
| 7,521,141 B2 | 4/2009 | Alberti et al. | |
| 2005/0164092 A1 | 7/2005 | Alberti et al. | |
| 2010/0027098 A1 | 2/2010 | Piroux et al. | |
| 2010/0172011 A1 | 7/2010 | Piroux et al. | |
| 2010/0208325 A1 | 8/2010 | Piroux et al. | |
| 2015/0096934 A1 | 4/2015 | Xiao et al. | |

FOREIGN PATENT DOCUMENTS

| | | | |
|---|---|---|---|
| CN | 100513394 C | | 7/2009 |
| CN | 101838198 | * | 9/2010 |
| CN | 101780378 B | | 12/2011 |
| CN | 102755841 B | | 2/2014 |
| CN | 103657716 A | | 3/2014 |
| CN | 104226124 A | | 12/2014 |

(Continued)

OTHER PUBLICATIONS

Bonyadi et al., "Highly porous and macrovoid-free PVDF hollow fiber membranes for membrane distillation by a solvent-dope solution co-extrusion approach," Journal of Membrane Science, vol. 331, 2009 (available online Jan. 19, 2009), pp. 66-74.

(Continued)

*Primary Examiner* — Irina S Zemel
(74) *Attorney, Agent, or Firm* — Birch, Stewart, Kolasch & Birch, LLP

(57) ABSTRACT

A method of manufacturing a porous fluorine-containing polymer membrane is provided, which includes mixing a fluorine-containing polymer, a pore creating agent, and a solvent to form a mixture; forming a membrane of the mixture, and removing the pore creating agent and the solvent in the membrane to form the porous fluorine-containing polymer film. The pore creating agent has a chemical formula of

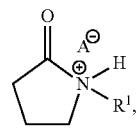

wherein $R^1$ is a $C_{1-8}$ alkyl group, a $C_{2-8}$ alkenyl group, a $C_{2-8}$ alkynyl group, or a $C_{6-12}$ aromatic group, and $A^{\ominus}$ is hydrogen sulfite ion, dihydrogen phosphate ion, nitrate ion, halogen ion, or a combination thereof. The solvent has a chemical formula of

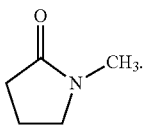

12 Claims, 5 Drawing Sheets

(56) References Cited

FOREIGN PATENT DOCUMENTS

WO     WO 2013/106413 A1     7/2013

OTHER PUBLICATIONS

Khayet et al., "Preparation and Characterization of Polyvinylidene Fluoride Membranes for Membrane Distillation," Industrial & Engineering Chemistry Research, vol. 40, No. 24, 2001 (published online Oct. 24, 2001), pp. 5710-5718.

Loh et al., "Insight into the role of amphiphilic pluronic block copolymer as pore-forming additive in PVDF membrane formation," Journal of Membrane Science, vol. 446, 2013 (available online Jul. 16, 2013), pp. 492-503.

Wang et al., "Hydrophobic PVDF hollow fiber membranes with narrow pore size distribution and ultra-thin skin for the fresh water production through membrane distillation," Chemical Engineering Science, vol. 63, 2008 (available online Feb. 20, 2008), pp. 2587-2594.

Wang et al., "Porous PVDF asymmetric hollow fibe membranes prepared with the use of small molecular additives," Journal of Membrane Science, vol. 178, 2000, pp. 13-23.

Taiwanese Office Action and Search Report, dated Jun. 17, 2016, for corresponding Taiwanese Application No. 104142227.

\* cited by examiner

METHOD OF MANUFACTURING POROUS FLUORINE-CONTAINING POLYMER MEMBRANE

CROSS REFERENCE TO RELATED APPLICATIONS

The present application is based on, and claims priority from, Taiwan Application Serial Number 104142227, filed on Dec. 16, 2015, the disclosure of which is hereby incorporated by reference herein in its entirety.

TECHNICAL FIELD

The technical field relates to a porous hydrophobic fluorine-containing polymer membrane, and production methods thereof.

BACKGROUND

The membrane distillation (MD) technology controls temperature gradients of fluids at two sides of a membrane to form a vapor pressure difference. An aqueous solution containing salt enters a high temperature side of the membrane to form water vapor. The water vapor is driven by the vapor pressure difference to transfer to a low temperature side of the membrane through membrane pores, and is then condensed to a liquid. As such, the salt is kept at the high temperature side of the membrane, thereby separating the water from the salt. The MD membrane material should simultaneously have high porosity and hydrophobic property, e.g. PVDF. For preparing conventional porous PVDF membranes, a pore creating agent should be added to tune a phase transfer mechanism between a coagulant (e.g. water) and a solvent for achieving the porous requirement when the PVDF membrane is shaped. The pore creating agent is generally an ionic compound, surfactant, hydrophilic polymer, or the like with different shortcomings. If the ionic compound or the hydrophilic polymer serves as the pore creating agent of the hydrophobic polymer membrane, the hydrophobic property of the polymer membrane will be reduced. If the surfactant serves as the pore creating agent of the hydrophobic polymer membrane, pores that are too large will be formed in the membrane.

Accordingly, a novel pore creating agent is called for for preparing a hydrophobic porous membrane to be applied in the MD.

SUMMARY

One embodiment of the disclosure provides a method of manufacturing a porous fluorine-containing polymer membrane, comprising: mixing a fluorine-containing polymer, a pore creating agent, and a solvent to form a mixture; forming a membrane of the mixture; and removing the pore creating agent and the solvent in the membrane to form the porous fluorine-containing polymer membrane, wherein the pore creating agent has a chemical formula of

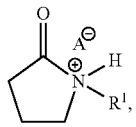

wherein $R^1$ is a $C_{1-8}$ alkyl group, a $C_{2-8}$ alkenyl group, a $C_{2-8}$ alkynyl group, or a $C_{6-12}$ aromatic group, and $A^\ominus$ is hydrogen sulfite ion, dihydrogen phosphate ion, nitrate ion, halogen ion, or a combination thereof, wherein the solvent has a chemical formula of

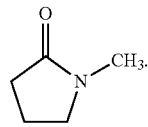

One embodiment of the disclosure provides a porous fluorine-containing polymer membrane, being a fluorine-containing polymer treated by a pore creating agent and having a β crystalline phase, wherein the pore creating agent has a chemical formula of

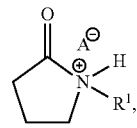

wherein $R^1$ is a $C_{1-8}$ alkyl group, a $C_{2-8}$ alkenyl group, a $C_{2-8}$ alkynyl group, or a $C_{6-12}$ aromatic group, and $A^\ominus$ is hydrogen sulfite ion, dihydrogen phosphate ion, nitrate ion, halogen ion, or a combination thereof.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
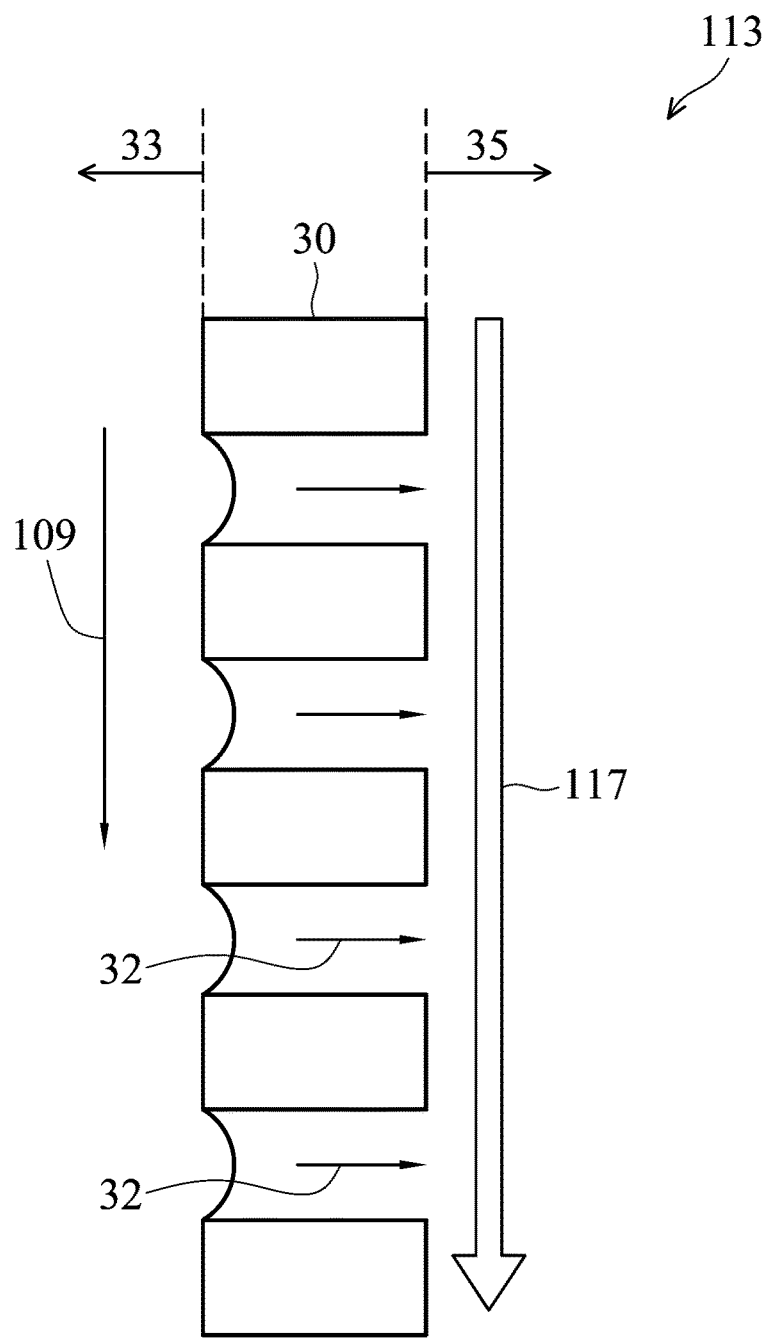
FIG. 1 shows a membrane distillation device in one embodiment of the disclosure.
Figure 2A:
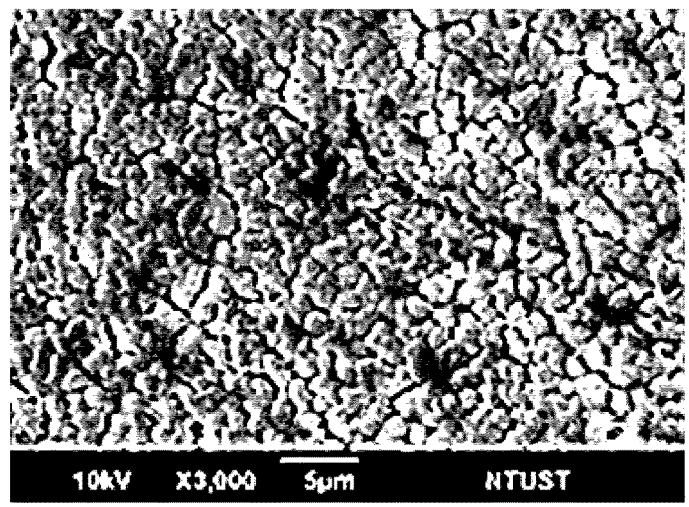
FIGS. 2A to 2E show SEM photographs of PVDF membranes in one embodiment of the disclosure.
Figure 2B:
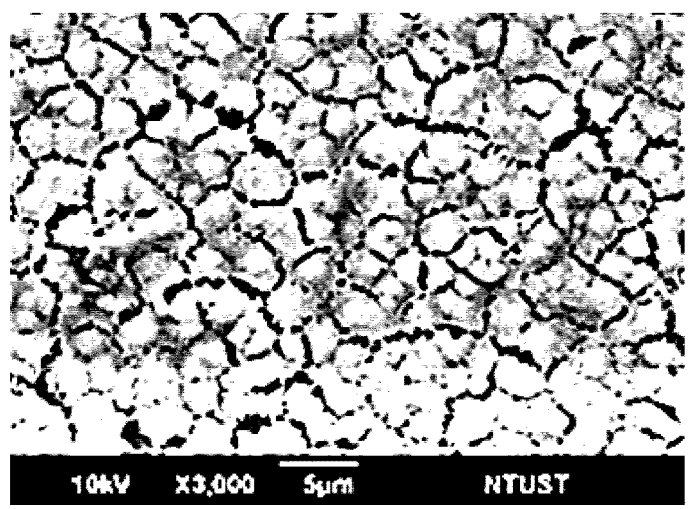
Figure 2C:
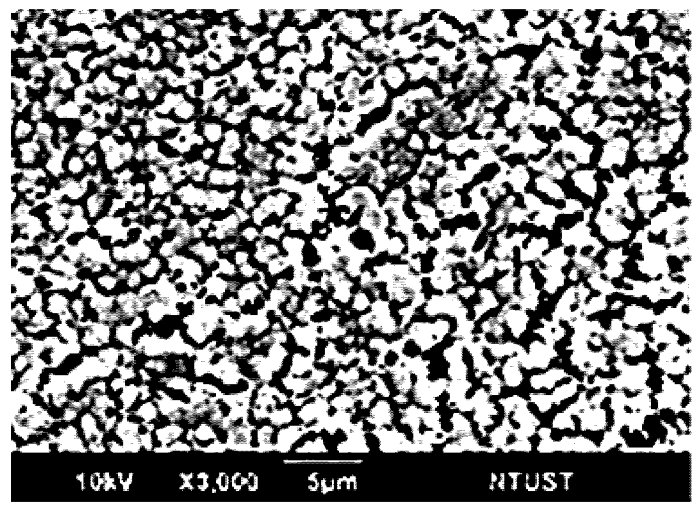
Figure 2D:
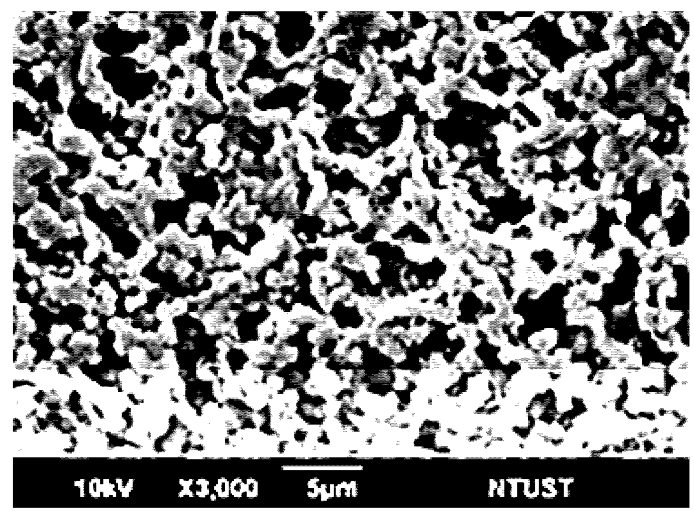
Figure 2E:
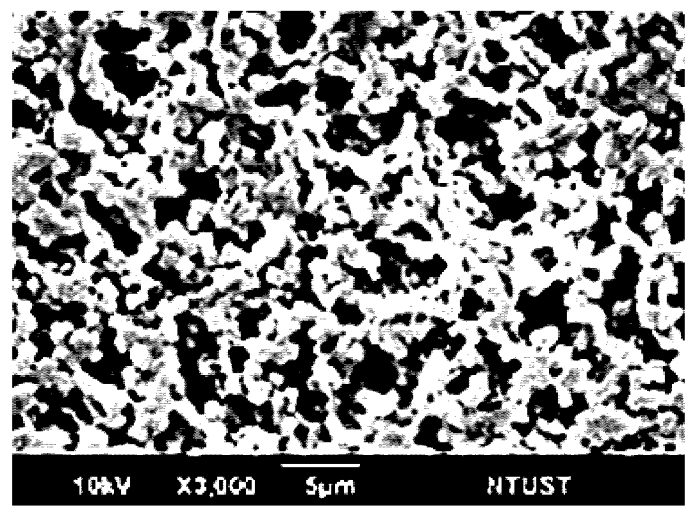

In the following detailed description, for the purposes of explanation, numerous specific details are set forth in order to provide a thorough understanding of the disclosed embodiments. It will be apparent, however, that one or more embodiments may be practiced without these specific details. In other instances, well-known structures and devices are shown schematically in order to simplify the drawing.

In one embodiment, a method of manufacturing a porous fluorine-containing polymer membrane includes mixing a fluorine-containing polymer, a multi-functional pore creating agent, and a solvent to form a mixture. The multi-functional pore creating agent is an organic salt compound, which has a chemical formula as shown in Formula 1.

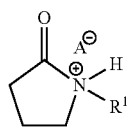

(Formula 1)

In Formula 1, $R^1$ is a $C_{1-8}$ alkyl group, a $C_{2-8}$ alkenyl group, a $C_{2-8}$ alkynyl group, or a $C_{6-12}$ aromatic group, and $A^{\ominus}$ is hydrogen sulfite ion, dihydrogen phosphate ion, nitrate ion, halogen ion, or a combination thereof. The multi-functional pore creating agent has an ionic liquid property. The organic functional group of the cation portion ($R^1$) and the anion portion ($A^{\ominus}$) can be changed to modify the surfactant property of the pore creating agent. Because the NMP often serves a solvent in a step of creating pores in a membrane, the multi-functional pore creating agent may control the solubility of the fluorine-containing polymer, the NMP solution, and the pore creating agent. The required pore size, hydrophobic property, and crystalline phase of the membrane can be obtained by controlling the pore creating agent structure.

In one embodiment, the solvent has a chemical formula as shown in Formula 2.

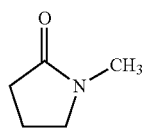

(Formula 2)

The molecule in Formula 2 is so-called NMP. The pore size and the hydrophobic property of the fluorine-containing polymer can be tuned by selecting the solvent and the pore creating agent. The pore creating agent includes not only the advantage of variable structure design, but also other application advantages such as easy processing, non-toxicity, and low-cost.

In one embodiment, the fluorine-containing polymer includes poly(vinylidene fluoride) (PVDF), poly(vinylidenefluoride-co-hexafluoropropylene) copolymer (PVDF-co-HFP), perfluoro alkoxyl polymer (PFA), fluorinated ethylene propylene copolymer (PEP), or ethylene tetrafluoroethylene copolymer (ETFE). The fluorine-containing polymer may have a weight average molecular weight (Mw) of 100000 to 1000000. A fluorine-containing polymer with an overly low Mw results in an overly low viscosity of a dope solution for forming the porous membrane. A fluorine-containing polymer with an overly high Mw results in an overly high viscosity of a dope solution for forming the porous membrane.

In one embodiment, the mixture has a fluorine-containing polymer content of 10 wt % to 15 wt %. In one embodiment, the mixture has a NMP content of 75 wt % to 89 wt %. In one embodiment, the mixture has a pore creating agent content of 1 wt % to 10 wt %.

A membrane is then formed of the mixture, and the pore creating agent and the solvent in the membrane are removed to form the porous fluorine-containing polymer membrane. The membrane of the mixture can be formed by spray coating, blade coating, spin-on coating, dipping, or other suitable methods. The pore creating agent and the solvent in the membrane can be replaced by water, alcohol, alkane, or a combination thereof to remove the pore creating agent and the solvent in the membrane. After removing the pore creating agent and the solvent in the membrane, the porous hydrophobic fluorine-containing polymer membrane can be dried further.

The porous hydrophobic fluorine-containing polymer membrane prepared by the above steps may have a pore size of 0.01 μm to 2 μm. If the pore size difference is less, the pore size will be more regular. Compared to conventional pore creating agents, the pore creating agents of the disclosure may make the pores in the fluorine-containing polymer have a more regular size and a more uniform distribution. Because the solvent and the pore creating agent have similar structures, the pore creating agent can be evenly mixed in the solvent and further evenly distributed in the fluorine-containing polymer, thereby forming pores with a regular size. In one embodiment, the porous hydrophobic fluorine-containing polymer membrane may have a porosity of 30% to 90%. A porous hydrophobic fluorine-containing polymer membrane with an overly low porosity has a poor MD performance. A porous hydrophobic fluorine-containing polymer membrane with an overly high porosity has less mechanical strength.

A surface of the porous hydrophobic fluorine-containing polymer membrane and water have a contact angle of 70° to 130°. On the other hand, the porous hydrophobic fluorine-containing polymer membrane has a β crystalline phase and free of an α crystalline phase. Compared to a porous hydrophobic fluorine-containing polymer membrane with the α crystalline phase, the porous hydrophobic fluorine-containing polymer membrane of the pure β crystalline phase has a higher hydrophobic property and a higher mechanical strength. In one embodiment, the porous hydrophobic fluorine-containing polymer membrane has a thickness of 20 μm to 500 μm.

The porous hydrophobic fluorine-containing polymer membrane is suitable for a MD device. A basic principle of the MD device 113 is shown in FIG. 1, which utilizes a porous hydrophobic organic polymer membrane to perform distillation. Water with a high salt concentration 109 with a higher temperature at a left side (inlet end 33) of the porous hydrophobic fluorine-containing polymer membrane 30 cannot enter the pores of the porous hydrophobic fluorine-containing polymer membrane 30 due to the surface tension effect, and only vapor 32 may transfer through the pores of the porous hydrophobic fluorine-containing polymer membrane 30 to be condensed at the right side (collection end 35) of the porous hydrophobic fluorine-containing polymer membrane 30 to form fresh water 117. A liquid with a lower temperature (e.g. water) flows at the right side of the porous hydrophobic fluorine-containing polymer membrane 30 to condense the vapor. After the treatment, the water with a high salt concentration 109 at the left side (inlet end 33) of the porous hydrophobic fluorine-containing polymer membrane 30 is concentrated further. The MD 113 in FIG. 1 is a so-called direct contact DM (DCMD) type. Alternatively, the MD device can be an air gap MD (AGMD) type, a sweeping gas MD (SGMD) type, or a vacuum MD (VMD) type with the described porous hydrophobic fluorine-containing polymer membrane.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Preparation Example 1

1 part by mole of N-methyl-2-pyrrolidone (NMP) and 1 part by mole of sulfuric acid were reacted at 0° C. for 0.5 hours, thereby obtaining a pore creating agent. The above reaction is shown in Formula 3.

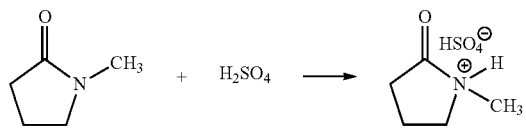

(Formula 3)

Preparation Example 2

1 part by mole of N-octyl-2-pyrrolidone (NOP) and 1 part by mole of sulfuric acid were reacted at 0° C. for 0.5 hours, thereby obtaining a pore creating agent. The above reaction is shown in Formula 4.

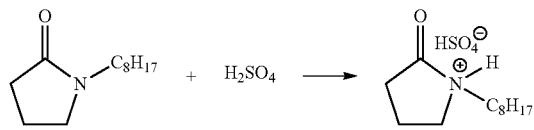

(Formula 4)

Example 1

Dried PVDF powder (Mw=800,000, Kynar HSV 900), NMP, and the pore creating agent in Preparation Example 1 or 2 were weighed according to ratios in Table 1, and then slowly stirred at 60° C. in water bath until the PVDF completely dissolved to form a homogeneous dope solution. The dope solution was then slowly cooled to 30° C., and bubbles thereof were removed. The dope solution was coated on a glass plate to form a membrane by a blade with a gap size of 300 μm. The glass plate and the membrane were then put into water. After the membrane was cured, water was changed several times to wash out the NMP and the pore creating agent in the membrane. The membrane was then dipped and washed in a mixture liquid of isopropanol (IPA) and water (v/v=1:1) several times, and then dipped and washed in IPA several times to completely remove the NMP and the pore creating agent. The membrane was then dried in air to obtain a porous PVDF membrane.

TABLE 1

| No. | Pore creating agent | PVDF (Parts by weight) | NMP (Parts by weight) | Pore creating agent (Parts by weight) |
|---|---|---|---|---|
| Example 1-1 | None | 12 | 88 | 0 |
| Example 1-2 | Product of Preparation Example 1 | 12 | 87 | 1 |
| Example 1-3 | Product of Preparation Example 1 | 12 | 78 | 10 |
| Example 1-4 | Product of Preparation Example 2 | 12 | 87 | 1 |
| Example 1-5 | Product of Preparation Example 2 | 12 | 78 | 10 |

SEM photographs of the porous PVDF membranes in Examples 1-1, 1-2, 1-3, 1-4, and 1-5 were shown in FIGS. 2A, 2B, 2C, 2D, and 2E, respectively. As shown in the SEM photographs, the pore creating agent of Preparation Example 1 (FIGS. 2B and 2C) or the pore creating agent of Preparation Example 2 (FIGS. 2D and 2E) might efficiently enhance the porosity of the PVDF membrane, in which the pore creating agent having the surfactant property in Preparation Example 2 had a higher effect.

Figure 3:
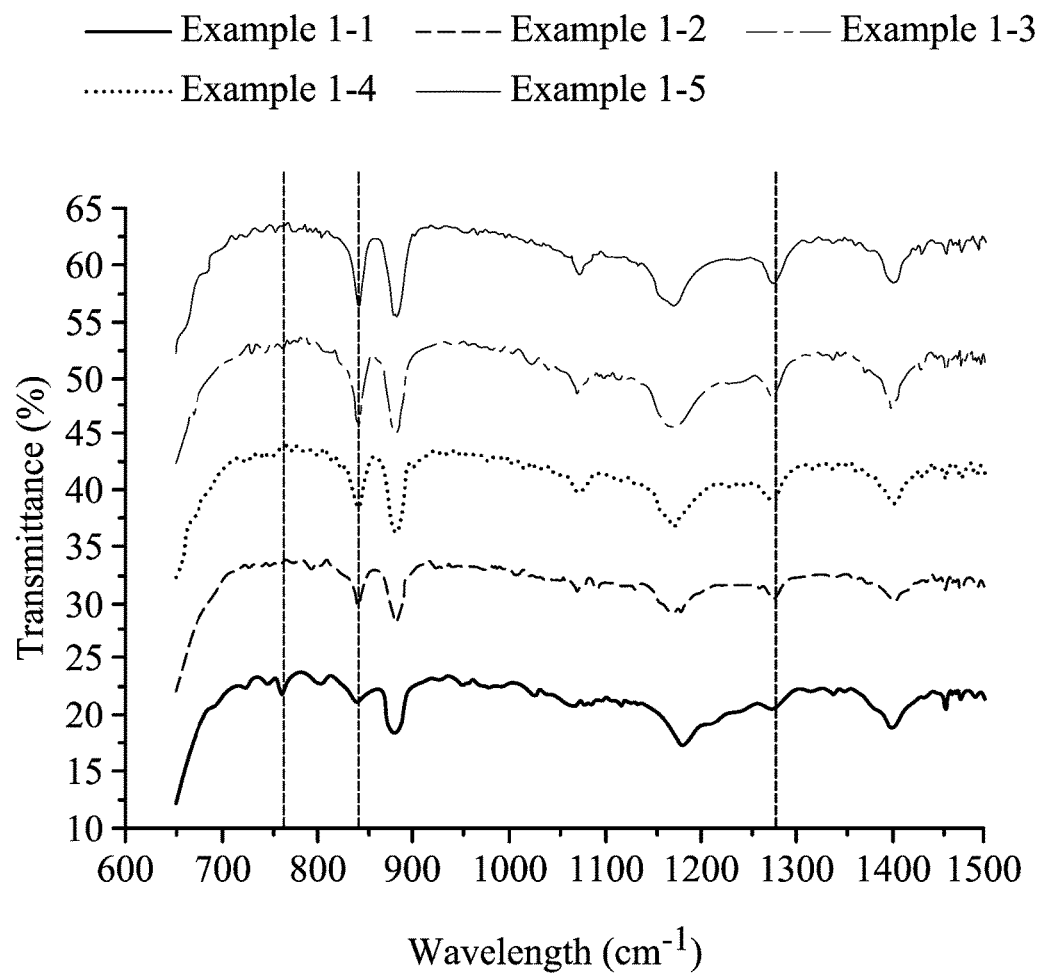
FIG. 3 shows a FTIR spectrum of a PVDF membrane in one embodiment of the disclosure.

The FTIR spectra of the porous PVDF membranes in Example 1-1, 1-2, 1-3, 1-4, and 1-5 are shown in FIG. 3. As shown in FIG. 3, the PVDF membrane prepared without the pore creating agent in Example 1-1 had the α crystalline phase (adsorption peaks at 762 $cm^{-1}$ and 796 $cm^{-1}$) and the β crystalline phase (adsorption peaks at 841 $cm^{-1}$ and 1275 $cm^{-1}$). The PVDF membranes prepared with the pore creating agent in Examples 1-2 to 1-5 had the β crystalline phase (adsorption peaks at 841 $cm^{-1}$ and 1275 $cm^{-1}$) without the α crystalline phase.

Example 2

The MD device was the DCMC type, and the membrane thereof was the porous PVDF membrane in Examples 1-1, 1-2, 1-3, 1-4, or 1-5. The original NaCl aqueous solution before treatment (e.g. the concentrate water 109 in FIG. 1) had a temperature of 70° C. and a conductivity of 3 mS/cm. The fresh water after treatment (e.g. the fresh water 117 in FIG. 1) had a temperature of 30° C. and a conductivity of less than 100/cm. The inlet direction of the NaCl aqueous solution was reverse flow. The sweeping flow rate of the DCMC was $2.9 \times 10^{-2}$ m/sec. The filtering mass fluxes of the different membranes are shown in Table 2.

TABLE 2

| | Example 1-1 | Example 1-2 | Example 1-3 | Example 1-4 | Example 1-5 |
|---|---|---|---|---|---|
| Mass flux (Kg/ hour · $m^2$) | 6.0 | 11.7 | 5.2 | 14.0 | 4.4 |

As shown in FIG. 2, the PVDF membranes prepared by appropriate amounts of the pore creating agent in Preparation Examples 1 and 2 could efficiently enhance the mass flux of the MD.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A method of manufacturing a porous fluorine-containing polymer membrane, comprising:
   mixing a fluorine-containing polymer, a pore creating agent, and a solvent to form a mixture;
   forming a membrane of the mixture; and
   removing the pore creating agent and the solvent in the membrane to form the porous fluorine-containing polymer membrane,
   wherein the pore creating agent has a chemical formula of

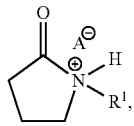

wherein $R^1$ is a $C_{1-8}$ alkyl group, a $C_{2-8}$ alkenyl group, a $C_{2-8}$ alkynyl group, or a $C_{6-12}$ aromatic group, and $A^\ominus$ is hydrogen sulfite ion, dihydrogen phosphate ion, nitrate ion, halogen ion, or a combination thereof,
   wherein the solvent has a chemical formula of

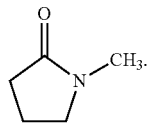

2. The method as claimed in claim 1, wherein the fluorine-containing polymer comprises poly(vinylidene fluoride), poly(vinylidenefluoride-hexafluoropropylene) copolymer, perfluoro alkoxyl polymer, fluorinated ethylene propylene copolymer, or ethylene tetrafluoroethylene copolymer.

3. The method as claimed in claim 1, wherein the fluorine-containing polymer has a weight average molecular weight of 100,000 to 1,000,000.

4. The method as claimed in claim 1, wherein the mixture includes 10 wt % to 15 wt % of the fluorine-containing polymer.

5. The method as claimed in claim 1, wherein the mixture includes 75 wt % to 89 wt % of the solvent.

6. The method as claimed in claim 1, wherein the mixture includes 1 wt % to 10 wt % of the pore creating agent.

7. The method as claimed in claim 1, wherein the porous fluorine-containing polymer membrane has a pore size of 0.01 μm to 2 μm.

8. The method as claimed in claim 1, wherein the porous fluorine-containing polymer membrane has a porosity of 30% to 90%.

9. The method as claimed in claim 1, wherein a surface of the porous fluorine-containing polymer membrane and water have a contact angle of 70° to 130°.

10. The method as claimed in claim 1, wherein the porous fluorine-containing polymer membrane has a thickness of 20 μm to 500 μm.

11. The method as claimed in claim 1, wherein the pore creating agent and the solvent in the membrane is removed by water, alcohol, alkane, or a combination thereof.

12. The method as claimed in claim 1, wherein the porous fluorine-containing polymer membrane has a β crystalline phase.

* * * * *